Feb. 27, 1934. S. E. OVERTON 1,949,081

FRAME

Filed May 15, 1933

INVENTOR
Samuel E. Overton
BY Chappell & Earl
ATTORNEYS

Patented Feb. 27, 1934

1,949,081

UNITED STATES PATENT OFFICE 1,949,081

FRAME

Samuel E. Overton, South Haven, Mich.

Application May 15, 1933. Serial No. 671,060

8 Claims. (Cl. 40—155)

The objects of this invention are:

First, to provide a picture or mirror frame of unusual and attractive appearance.

Second, to provide such a picture or mirror frame that is easily, simply and cheaply made without the necessity of joining the side members of the frame.

Third, to provide such a picture or mirror frame that can be turned out in quantities.

Fourth, to provide such a picture or mirror frame that may be collapsed and folded into a small package for shipment.

Fifth, to provide an article that may be used as a tray if desired.

Further objects relating to details of construction will appear from the detailed description to follow. The invention is defined in the claims.

A structure embodying my invention is illustrated in the accompanying drawing, in which.

Figure 5:
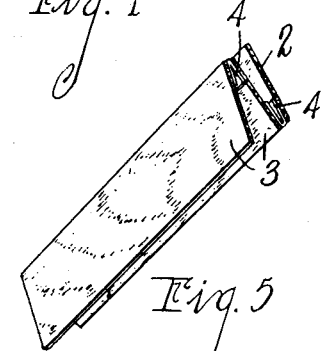
Fig. 5 is a view of the back in collapsed position for packaging.
Figure 2:
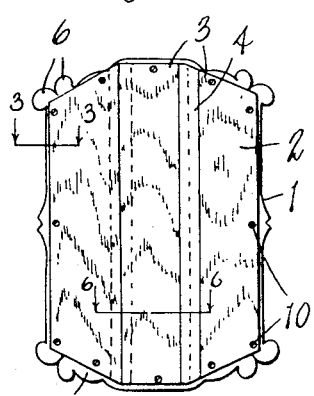
Fig. 2 is a back view of the frame.
Figure 6:
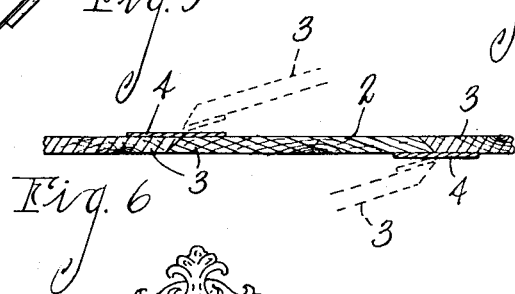
Fig. 6 is a sectional view of the back in unfolded position taken on line 6—6 of Fig. 2.

My picture or mirror frame 1, which may also be a tray formed along the same lines, is made up of a back 2, which is here shown as formed of three veneer panels 3 having the edges beveled as shown in Fig. 6, so as to form a close joint. The edges may be squared but it is desirable to have them abut closely. These panels are joined by a strip of paper tape 4 or any suitable hinge material, to hold them in desired assembled position. In Fig. 6 in dotted lines I show the pieces folded back. The back 2 may be folded up as shown in Fig. 5 for shipping purposes.

Figure 1:
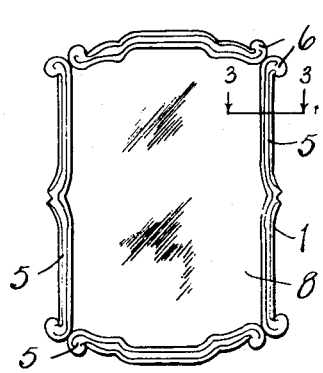
Fig. 1 is a front view of my finished frame.
Figure 3:
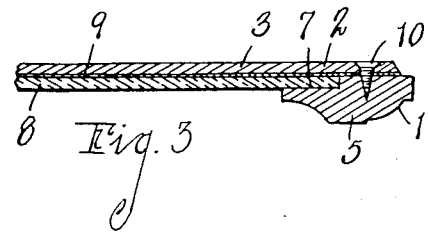
Fig. 3 is a partial sectional view of my frame taken on line 3—3 of Figs. 1 and 2.
Figure 4:
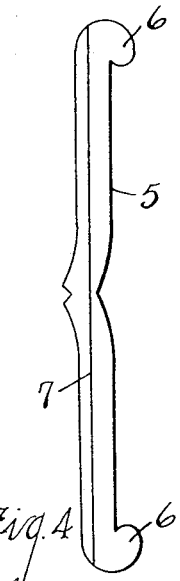
Fig. 4 is a bottom view of an edge molding piece for use in my frame.
Figure 7:
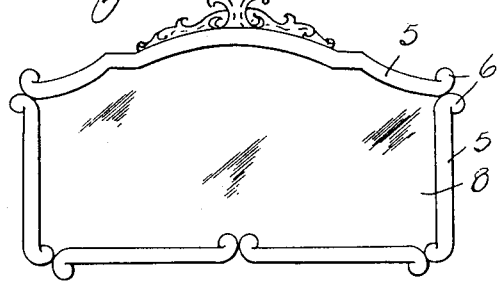
Fig. 7 is a front view of a different form of the picture or mirror frame, made according to my invention.
Figure 8:
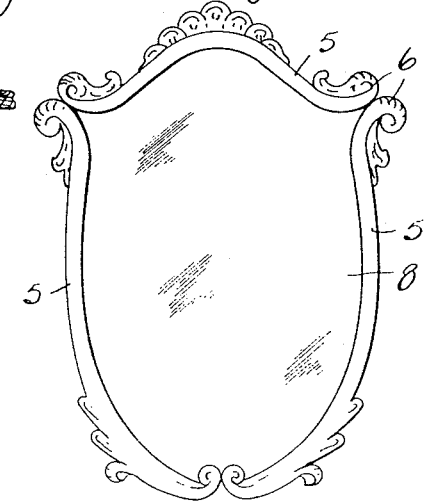
Fig. 8 is a front view of a different form of the picture or mirror frame, made according to my invention.

The frame 1 is composed of a plurality of side molding pieces 5 having curved ornamental ends 6 and being carved or otherwise decorated as shown in Figs. 1, 7 and 8. These pieces are rabbeted as at 7 to form recesses for reception of a glass, which may be a mirror or picture glass 8. The glass 8 is shaped to correspond to the back but is of such size that the back 2 projects beyond the edge of the glass as shown in Fig. 3. A picture 9 may be inserted back of the glass if desired.

The side pieces 5 are arranged about the periphery of the back with the glass disposed in the rabbeted recess 7 as shown in Fig. 3, and screws or other fastening means 10 project through the back and into the moldings or side pieces 5 to clamp the glass and picture, if one is used, against the back 2, the side pieces 7 acting as a clamp and support. "Side pieces" is a broad term embracing the ends as well. They are independent of each other and are supported and maintained in place by their connection to the back.

The curved ornamental ends 6 are placed adjacent one another and may be abutting or slightly spaced apart. In this way a complete frame is formed without the necessity for a joining operation which is expensive and requires skilled woodworking labor. The ends may be of any desired shape that will abut without giving an unfinished appearance. The curve seems to be most desirable because, regardless of positioning, there is a finished appearance to the completed article. It will be readily understood that the back need not be of the collapsible form shown. This is especially valuable from a shipping point of view because frames can be purchased by a customer and the backs 2 and side pieces 7 may be enclosed in a long thin package, as will be readily understood.

Figs. 7 and 8 show slight modifications of the general form of my invention. The side pieces 7 in these views are much more ornate and are curved to give the desired shape to the finished article. It will be understood that my device can also be made in a tray rather than in a picture frame, and that the borders formed by the side pieces 7 give a highly ornamental effect.

I have described the device using a glass 8, but any transparent substance may be used or the frame may be made merely to hold a picture without a glass in position against the back. When used as a tray the glass is not indispensable and the side pieces 7 give the desired ornamental effect against a wooden background.

Having thus described my invention, what I claim as new and desire to secure by Letters Patent is:

1. In an article of the class described, the combination of a back comprising a plurality of wood panels with abutting edges, paper tape hinges connecting said panels, a plurality of side pieces of molding disposed end to end around the periphery of said back to form a frame without joints, each side piece being rabbeted to form a glass receiving recess and having curved ornamental ends, a sheet of glass extending into said rabbeted recess and corresponding to said back, and screws extending through said back and into said side pieces whereby said side pieces clamp and support said glass in said rabbeted recess and against said back.

2. In an article of the class described, the combination of a back comprising a plurality of wood panels with abutting edges, paper tape hinges connecting said panels, a plurality of side pieces of molding disposed end to end around the periphery of said back to form a frame without joints, each side piece being rabbeted to form a glass receiving recess and having curved ornamental ends, a sheet of glass extending into said rabbeted recess and corresponding to said back, and means fastening said side pieces to said back whereby said side pieces clamp and support said glass in said rabbeted recess and against said back.

3. In an article of the class described, the combination of a back comprising a plurality of panels with abutting edges, hinges connecting said panels, a plurality of side pieces of molding disposed end to end around the periphery of said back to form a frame without joints, each side piece being rabbeted to form a glass receiving recess and having curved ornamental ends, a sheet of glass extending into said rabbeted recess and corresponding to said back, and means fastening said side pieces to said back whereby said side pieces clamp and support said glass in said rabbeted recess and against said back.

4. In an article of the class described, the combination of a back comprising a plurality of panels with abutting edges, hinges connecting said panels, a plurality of side pieces of molding disposed end to end around the periphery of said back to form a frame without joints, each side piece being rabbeted to form a glass receiving recess, a sheet of glass extending into said rabbeted recess and corresponding to said back, and means fastening said side pieces to said back whereby said side pieces clamp and support said glass in said rabbeted recess and against said back.

5. In an article of the class described, the combination of a back, a plurality of side pieces of molding disposed end to end around the periphery of said back to form a frame without joints, each side piece being rabbeted to form a glass receiving recess and having curved ornamental ends, a sheet of glass extending into said rabbeted recess and corresponding to said back, and screws extending through said back and into said side pieces whereby said side pieces clamp and support said glass in said rabbeted recess and against said back.

6. In an article of the class described, the combination of a back, a plurality of side pieces of molding disposed end to end around the periphery of said back to form a frame without joints, each side piece being rabbeted to form a glass receiving recess and having curved ornamental ends, a sheet of glass extending into said rabbeted recess and corresponding to said back, and means fastening said side pieces to said back whereby said side pieces clamp and support said glass in said rabbeted recess and against said back.

7. In an article of the class described, the combination of a back, a plurality of side pieces of molding disposed end to end around the periphery of said back to form a frame without joints, each side piece having curved ornamental ends, a sheet of glass corresponding to said back, and means fastening said side pieces to said back whereby said side pieces clamp and support said glass against said back.

8. In an article of the class described, the combination of a supporting back, a plurality of side pieces of molding disposed end to end around the periphery of said back to form a frame without joints, each side piece having curved ornamental ends, and means fastening said side pieces to said back, whereby the back maintains said frame parts in place.

SAMUEL E. OVERTON.